United States Patent [19]
Ng

[11] Patent Number: 5,748,945
[45] Date of Patent: May 5, 1998

[54] METHOD FOR SLAVE DMA EMULATION ON A COMPUTER SYSTEM BUS

[75] Inventor: Timothy C. Ng, Cary, N.C.

[73] Assignee: International Business Machines Corporation, Armonk, N.Y.

[21] Appl. No.: 657,845

[22] Filed: May 31, 1996

[51] Int. Cl.$^6$ .................................................. G06F 13/00
[52] U.S. Cl. ........................ 395/500; 395/299; 395/842; 395/822
[58] Field of Search ............................... 395/842, 309, 395/500, 830, 299

[56] References Cited

U.S. PATENT DOCUMENTS

| | | | |
|---|---|---|---|
| 5,335,329 | 8/1994 | Cox et al. | 395/325 |
| 5,450,551 | 9/1995 | Amini et al. | 395/299 |
| 5,590,377 | 12/1996 | Smith | 395/842 |
| 5,598,576 | 1/1997 | Hsu et al. | 395/822 |
| 5,668,957 | 9/1997 | Davis et al. | 395/309 |

OTHER PUBLICATIONS

Kenneth L. Short, Microprocessors and programmed logic, second edition pp. 353–360.

Primary Examiner—Kevin J. Teska
Assistant Examiner—Hani Mahmoud Kazimi
Attorney, Agent, or Firm—Steven B. Phillips

[57] ABSTRACT

Method for providing slave direct memory access (DMA) support on a computer system bus that does not support slave devices, such as the personal computer interconnect or "PCI" bus. Using the method, an adapter card or microprocessor with a local DMA controller can be operated as a busmaster and simulate a system DMA controller which would normally be used during slave DMA operations. Alternatively, the method allows a local DMA controller to work with an existing system DMA controller so that application software receives the correct status when polling registers in the system DMA controller. The method allows the system DMA controller to operate as if the system DMA controller is controlling DMA transfers. In this way device contention between the system DMA controller and the local DMA controller is avoided.

5 Claims, 7 Drawing Sheets

METHOD FOR SLAVE DMA EMULATION ON A COMPUTER SYSTEM BUS

CROSS-REFERENCE TO RELATED APPLICATION

This application is related to co-pending, commonly assigned application Ser. No. 08/656,657, filed the same date and entitled, "Apparatus for Slave DMA Emulation on a Computer System Bus."

BACKGROUND

1. Field of the Invention

This invention is related to direct memory access (DMA) methods as used over computer system buses. More specifically, the invention is related to a way in which slave DMA emulation can be accomplished over a computer system bus that does not intrinsically support so-called "slave" DMA devices.

2. Definition of the Problem

With increased use of personal computers in every facet of business and personal life has come the demand for ever increasing capabilities of peripheral adapter cards that plug into those personal computers. Adapter cards contain special purpose circuitry to perform special functions required by the user. For example, adapter cards can act as modems, sound processors or video processors. A peripheral adapter card usually contains a specialized microprocessor such as a digital signal processor or an embedded controller. One way in which the capability of peripheral adapter cards is enhanced is to provide for direct interchange of data between the adapter card and the host computer's main system memory. Such interchange is known in the industry as direct memory access or "DMA". Operating principles for computer system buses with DMA capability are well known in the art, and many types of computer system buses today have DMA capability. For example, the industry standard architecture or "ISA" bus popular in IBM compatible personal computers provides DMA capability.

Some DMA capable computer system buses, including the ISA bus, provide for operation with two different types of DMA devices, master devices and a slave devices. For the purpose of this disclosure, I call such a bus a "master/slave" computer system bus. In order to provide for operation of a slave device, the bus must be connected to a system DMA controller, which serves to manage the data flow during slave DMA data transfers. For DMA transfers to and from a master device, however, the system DMA controller is not used. Instead, a DMA controller is located on the peripheral card. A peripheral card with such a DMA controller is called a busmaster card. U.S. patent application Ser. No. 08/556,773, filed Nov. 2, 1995, which is assigned to the assignee of the present application, describes some of the advantages of an adapter card which acts as a busmaster, and is incorporated herein by reference. With a busmaster card on the computer system bus, the DMA controller on the adapter card, called the local DMA controller, takes control of the bus during DMA data transfers and manages the data flow.

Some peripheral adapter cards require DMA data transfers, but have no local DMA controller. Such adapter cards always operate as "slave" devices for doing DMA data transfers between the adapter card and the computer system main memory. With a slave device, the device driver software running in the host computer system notifies the system DMA controller of the starting address and the depth of the DMA data transfer to take place. The slave device on the adapter card then requests the system DMA controller to take over the bus and manage the DMA data transfer between the host computer memory and the device on the adapter card. The request is communicated to the system DMA controller through a specific set of connections in the bus. In the industry standard architecture (ISA) bus, the adapter card requests the system DMA controller to perform a transfer through a line called the DMA request or "DRQ" line, and receives acknowledgment signals from the system DMA controller through the DMA acknowledgment or "DACK" line. The system DMA controller than takes over the bus and manages the transfer in the same way as does a busmaster card.

A problem with slave devices is that they depend on the bus involved having a system DMA controller. Some computer system buses, have no system DMA controller and so not operate at all with slave devices, but only with busmaster devices. For purposes of this disclosure, I call such a bus a "master-only" computer system bus. An example of a master-only bus is the personal computer interconnect or "PCI" bus. On the PCI bus, all bus cycle initiators must operate as busmaster devices. There is no slave DMA support and no system DMA controller. The PCI bus offers high bandwidth and fast clock speed, making it popular for use in today's high performance IBM compatible personal computers. To take advantage of these features, adapter card designers are designing PCI versions of their peripheral adapter cards.

The problem with using one of these PCI cards is that the application software designed to work with the ISA version of the card in some cases expects to operate the card as a slave for DMA data transfers. Computer users wish to use their existing software applications with the PCI version of an adapter card. The PCI version of an adapter card will perform the same function as the ISA version of the card, using similar circuitry. For purposes of this disclosure, we call the circuitry that performs the special purpose function on the adapter card emulation circuitry. The circuitry may perform sound generation, communication, or some other function. If the application software for the adapter card operates the ISA version of the card as a "slave" device, the software will not work with the PCI version of the card, unless the on-card DMA controller emulates slave operation as well as operating as a busmaster device. Such is the case with the popular SoundBlaster™ compatible adapter card and many popular game applications. However, if the personal computer in question has both master-only and master/slave computer system buses, it will also have a system DMA controller. In this case, unacceptable device contention will occur if the local DMA controller on the adapter card acts as a system DMA controller to make the card work as a slave device. What is needed is a way to emulate slave DMA operations on a master-only computer system bus, such as the PCI bus in such a way as to accommodate the possibility of a system DMA controller being present in the computer system.

SUMMARY

The above need is met by the present invention, which provides a method for operating processing circuitry including a local DMA controller for an adapter card which can operate in two modes. The local DMA controller can provide a full DMA mode acting as a busmaster but presenting appropriate registers to the bus so that an application sees a slave device and a system DMA controller. In addition, the local DMA controller can also operate in a slave DMA emulation mode when it is installed in a host computer system which contains both a master-only bus and a master/slave bus. The slave emulation mode is extremely useful in IBM compatible personal computers which usually contain both an industry standard architecture (ISA) bus and a personal computer interconnect (PCI) bus. This type of personal computer has a system DMA controller which must not contend with the local DMA controller on the adapter card if proper operation is to be maintained.

The method of the present invention is preferably implemented on a special purpose microprocessor, such as a digital signal processor or DSP. In addition to core logic, such a microprocessor is provided with its own built-in DMA controller, called the local DMA controller. A local DMA controller according to the present invention has not only connections for master-only bus interface logic, but also connections for a system DMA controller which is included in computer systems which have a master/slave computer system bus in addition to the master-only computer system bus. In a microprocessor designed for systems in which the master/slave bus is an ISA bus, these connections are the DRQ and DACK connections previously discussed. The microprocessor also includes master-only bus interface logic disposed between the local DMA controller and the core logic and emulation logic disposed between the local DMA controller and the core logic. The master-only bus interface logic has a master-only bus interface.

The local DMA controller described above is used in a host computer system, usually on an adapter card. The processing circuitry described above can be installed on an adapter card which is designed to work in a host computer system with no system DMA controller. Such a card would have a connector for the master-only bus alone. In this case, the connections for the system DMA controller are un-used. The invention can also be used on an adapter card with a connector for both a master-only computer system bus and a master/slave computer system bus. In this case the processing circuitry on the adapter card is connected to the system DMA controller through the master/slave computer system bus. In either case some of the various components on the adapter card such as the local DMA controller or the emulation logic can be on separate chips, but preferably they are all integrated onto a single microprocessor.

In full DMA mode, the local DMA controller operates by receiving the word count and starting address of a DMA transfer, receiving the request, performing the DMA transfer over the master-only computer system bus, updating internal status registers, and notifying the emulation logic when a transfer is complete. In slave DMA emulation mode, the local DMA controller monitors the master-only bus for DMA activity, latches DMA control information, performs the transfer on the master-only bus and also directs the system DMA controller to perform the transfer on the master/slave bus, and notifies the emulation logic that the transfer is complete. In both cases the process may be repeated if more than one transfer is needed to move all the data.

This invention provides a versatile method of operating a local DMA controller that can not only operate in full DMA mode without a system DMA controller but also in slave DMA emulation mode with a system DMA controller. The invention can be used in a computer system with a master-only computer system bus such as the PCI bus. The invention can also be used in a computer system with both a master-only computer system bus and a master/slave computer system bus such as the ISA bus which has a system DMA controller. The invention provides for both master and slave DMA operation in either type of system without causing device contention problems.

DETAILED DESCRIPTION OF THE PREFERRED EMBODIMENT

Figure 1:
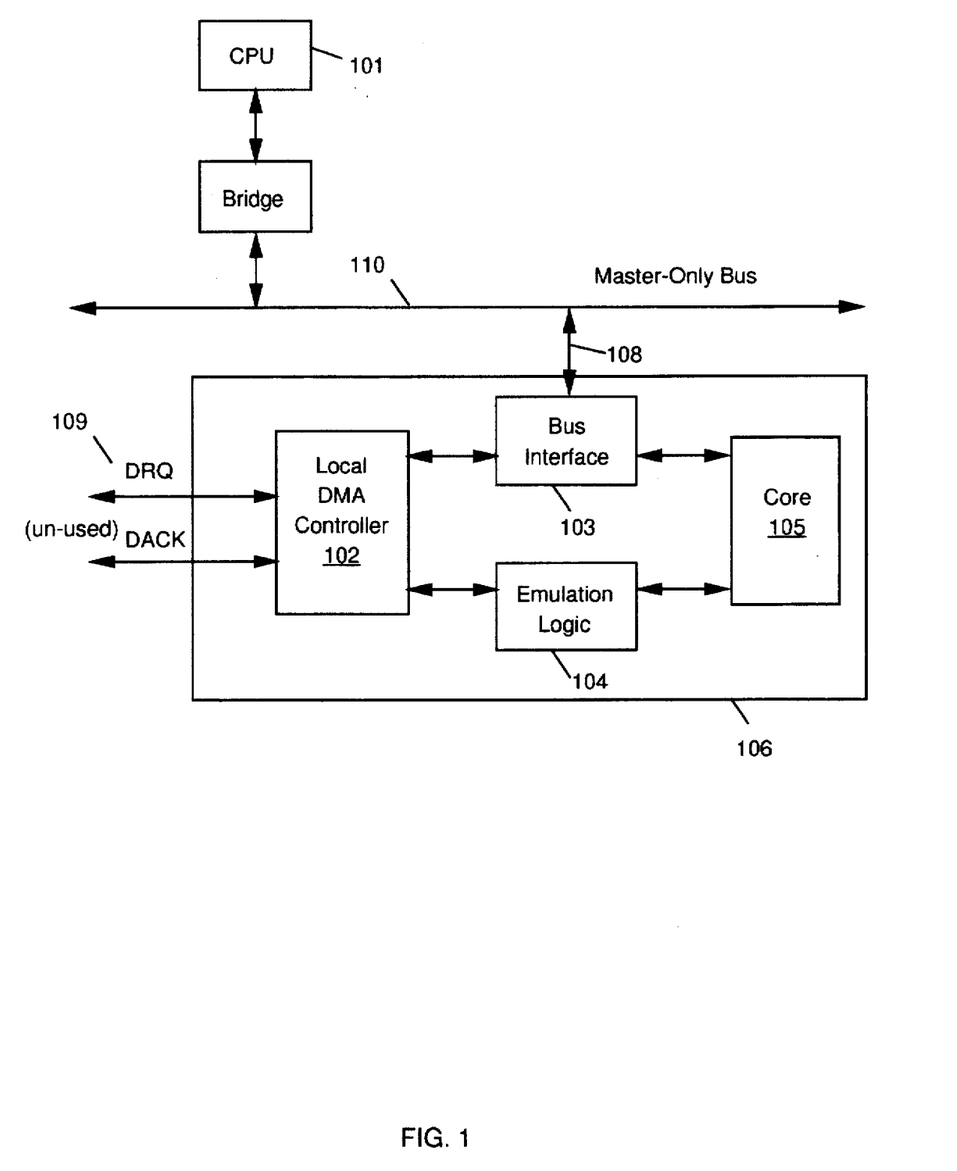
FIG. 1 shows the processing circuitry in which the present invention is used in a system with only a master-only computer system bus.

FIG. 1 shows the processing circuitry 106 which uses the invention connected to a master-only computer system bus 110 such as a PCI bus. The processing circuitry 106 is usually integrated into a single microprocessor such as a digital signal processor. The microprocessor core 105 is connected to the bus interface logic 103 and the emulation logic 104.

The emulation logic 104 provides hardware to implement the user function or user functions of the adapter. These functions may be sound generation, modem functions, video, speech recognition, telephone answering functions, or any combination of the above or other functions. The emulation logic 104 may include additional connectors for devices external to the host computer system such as a microphone or speakers. These are not shown for simplicity.

The bus interface logic 103 and the emulation logic 104 are both connected to the local DMA controller 102. Assuming that the adapter in which the invention is used is designed to operate with the PCI bus, the local DMA controller is connected to the PCI bus 110 through the master-only bus interface logic 103 and the master-only bus interface 108. The PCI bus 110 is connected to the host system CPU 101 through a CPU bridge.

The bus interface logic 103 provides the handshaking interface control among the internal logic elements 102 and 105, already described, and the master-only bus. This control allows the core logic 105 and the local DMA controller 102 to be used in various bus architectures. In the case of the PCI bus, the bus interface is a PCI bridge that supports the local interface protocol of the local DMA controller and the core logic. The CPU bridge provides the handshaking between the host CPU and a specific master-only computer system bus. This CPU bridge can also contain other logic elements which are tightly coupled with the CPU such as a memory controller or a video controller. In the case of a PCI system, the CPU bridge contains a DRAM controller.

The local DMA controller 102 has connections 109 for a system DMA controller. If the local DMA controller is designed to work with the ISA architecture in machines where an ISA bus is present, these connections are DRQ and DACK. In FIG. 1, the adapter card is connected only to the master-only PCI bus; therefore, the connections 109 are unused. In this case, if the function of the card requires it to be accessed as a slave device by the software running in the system, the local DMA controller operates in full DMA mode. The local DMA controller then emulates a system DMA controller. In the preferred embodiment of the invention, the function of the card was originally implemented on the ISA bus and the local DMA controller emulates an Intel 8237 DMA controller, which is common in personal computers using ISA or industry standard architecture.

The local DMA controller emulates the 8237 DMA controller by providing the following DMA registers, which are identical to the registers in the 8237. Only one DMA channel is shown here. If another DMA channel is chosen, the appropriate registers for that channel are used. A complete description of the register set and function for the Intel 8237 controller can be found in the Intel Peripheral Data Book, October, 1989, or the CS8233 PEAK/386 AT Chipset Data Book, December, 1990, both of which are incorporated herein be reference.

| ISA I/O Address | Read or Write Oper. | DMA Register |
| --- | --- | --- |
| 00010 | Read | Channel 1 Current Register |
| 00010 | Write | Channel 1 Base and Current Register |
| 00011 | Read | Channel 1 Current Word Count |
| 00011 | Write | Channel 1 Base and Current Word Count |
| 01000 | Read | Status Register |
| 01000 | Write | Write Command Register |
| 01001 | Write | Write Request Register |
| 01010 | Write | Write Single Mask Register |
| 01011 | Write | Write Mode Register |
| 01100 | Write | Write Byte Pointer Flip/Flop |
| 01101 | Read | Read Temporary Register |
| 01101 | Write | Master Clear |
| 01110 | Write | Clear Mask Register |
| 01111 | Write | Write All Mask Register Bits |

The local DMA controller 102 claims all access to these registers after it has been programmed for the appropriate channel in full DMA mode.

Figure 3:
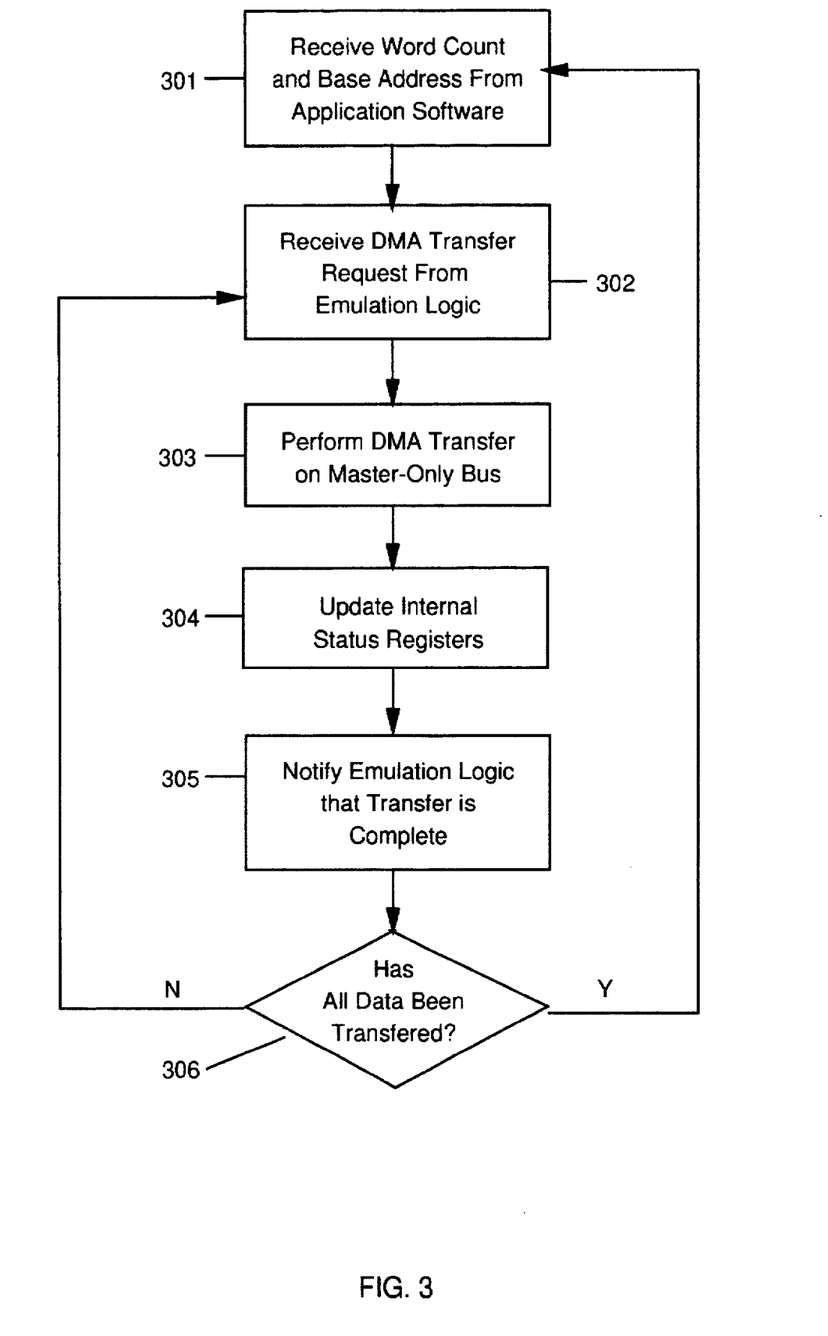
FIG. 3 shows the method according to the present invention of operating a local DMA controller in full DMA mode.

FIG. 3 shows the method which the local DMA controller uses in full DMA mode to perform a DMA transfer in full DMA mode once the local DMA controller is programmed for the appropriate channel. The channel is set by the system BIOS or by device drivers at power-up or program load time. At 301 the local DMA controller receives the word count, the base address, and the direction for the next DMA transfer. At 302, the application software or software driver running in the host computer system requests the DMA data transfer and the local DMA controller receives the request from the emulation logic. At 303 the local DMA controller performs the transfer over the bus. The local DMA controller performs the transfer by initiating a bus request, then receiving a grant, then performing read and/or write bus cycles to the appropriate memory address. When the process is complete, the local DMA controller updates its internal address, word count, and status registers at 304. This step is necessary because application or driver software often checks the status of these registers. At 305 the local DMA controller notifies the emulation logic that the transfer is compete. At 306, a determination is made as to whether more data must be moved to complete the transfer. If more data must be moved, another transfer request is processed beginning at 302. If the transfer is complete, the process repeats the next time a DMA transfer is required.

Figure 2:
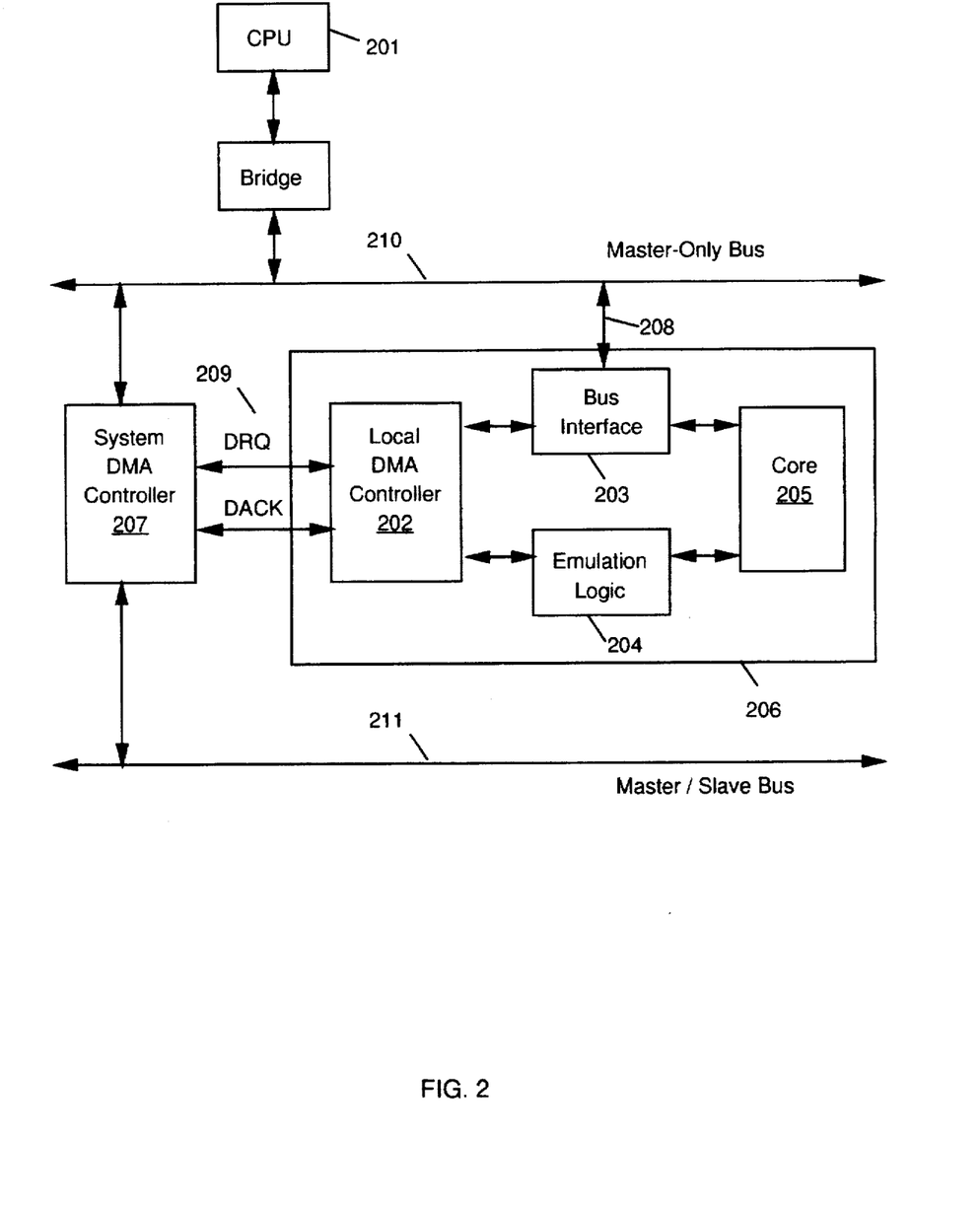
FIG. 2 shows the processing circuitry in which the present invention is used in a computer system with both a master-only computer system bus and a master/slave computer system bus.

FIG. 2 shows an adapter card operating in slave DMA emulation mode. The special purpose circuitry or microprocessor 206 has the same components as in FIG. 1: microprocessor core 205, bus interface 208; bus interface logic 203; emulation logic 204; and the local DMA controller 202. In this case, the invention is being used in a system with both a master-only bus 210 which, in this embodiment is a PCI bus, and a master/slave bus 211, which in this embodiment is an ISA bus. The master-only bus interface 208 connects the bus interface logic 203 to the master-only bus. The master-only bus is then connected to a host system CPU 201 through a bridge.

In the arrangement of FIG. 2, the host computer system has a system DMA controller 207. In this case, the connections for a system DMA controller 209, DRQ and DACK are connected to the system DMA controller 207. These connections are normally made through one of the buses, but they are shown as made directly between the DMA controllers to better illustrate the concepts of the invention. This arrangement permits the local DMA controller 202 to snoop the PCI bus 210 for DMA activity. If the ISA version of the adapter card with the emulation logic function is a slave device, the application software or driver will try to initiate slave DMA transfers by first communicating the starting address and depth of the next transfer to the system DMA controller 207. The local DMA controller 202 captures this information, but then directs the system DMA controller 207 to perform the transfer on the ISA bus to obtain the correct status for its registers. For slave DMA writes, the system DMA controller 207 will read all 1's from the ISA bus because of pull-up resistors normally connected to the ISA bus, and write all 1's to system memory. The local DMA controller 202 will then replace this data in memory with the correct data supplied by the emulation logic 204. For DMA reads, the system DMA controller 207 will write the data to the ISA bus and it will be lost; however, the correct data will also be written to the emulation logic 204 by the local DMA controller 202. In this way, the system DMA controller will always have the correct status in its registers, which may be polled by the application software, but will not effect the actual DMA transfers.

Figure 4:
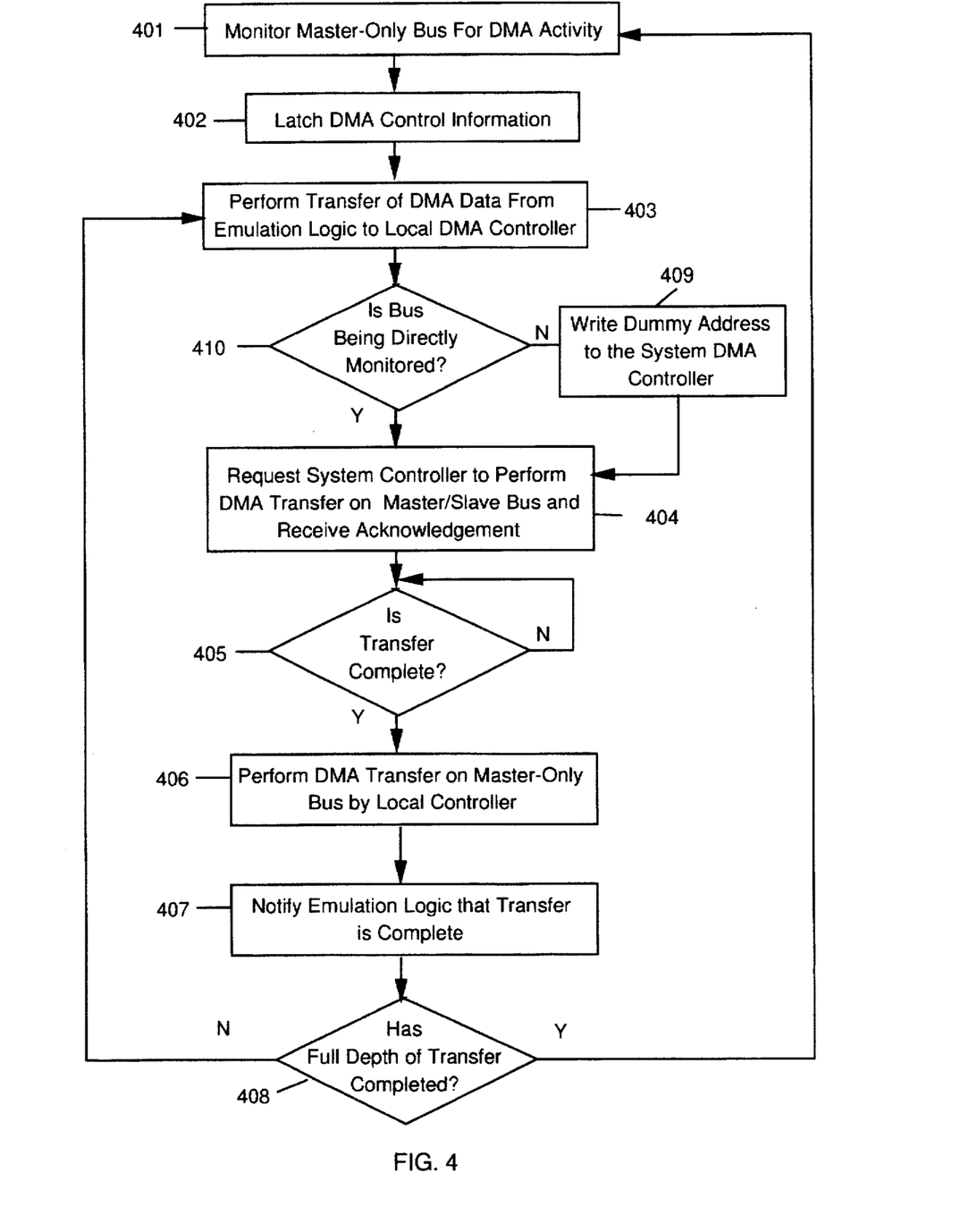
FIG. 4 shows the method according to the present invention of performing a DMA write with the local DMA controller in slave DMA emulation mode.

FIG. 4 illustrates the method according to the present invention of performing a write with the local DMA controller in slave DMA emulation mode. The local DMA controller monitors the bus for DMA activity at 401. When the host system CPU writes the DMA control information including the starting address and depth of the next transfer to the system DMA controller, the local DMA controller latches this information at 402. The local DMA controller transfers the data from the emulation logic on the adapter to the local DMA controller at 403. At 410, the local DMA controller has two options. It can alter the system DMA controller's current address at 409 before it requests the system DMA controller to perform the same transfer on the master/slave bus. Alternatively, it can go directly to step 404. If it alters the address, it will write a dummy 32-bit byte address to the system DMA controller before the transfer request is made. The address location is pre-allocated during system initialization. By altering the current address, the local DMA controller can avoid the system DMA controller clobbering the intended DMA target memory before the local DMA controller writes the true data. Step 409 may be necessary if the host software is constantly reading the target memory location for a change of a specific value.

At step 404, the local DMA controller requests the system DMA controller to perform the same transfer on the master/slave bus and receives an acknowledgment. This activity is handled by the DRQ and DACK signals in the case of the ISA bus, as previously discussed. A check is made at 405 to see if the dummy transfer is complete. Once that transfer is complete, the local DMA controller transfers the real data to the system memory over the master-only bus at 406. The local DMA controller notifies the emulation logic that the transfer is complete at 407. At 408, a determination is made as to whether more data must be moved to complete the transfer. If so, the process repeats beginning from 403. If not, the process resets to the beginning.

As previously discussed, the system DMA controller writes all 1's to memory initially. Since this data must be replaced with the true data when the dummy transfer is complete, the determination at 405 as to when the dummy transfer is complete is critical. The preferred way to get the true data to system memory as soon as possible is to directly monitor the transfer by snooping the master-only bus to determine when the transfer is compete. Using the snooping function for this determination minimizes the possibility of lost data if the system DMA controller writes all 1's into memory after de-asserting the DACK line. If this is not a possibility so that timing is not so critical, the determination at 405 can be made by monitoring the DACK line for de-assertion. The de-assertion of the DACK line serves as an acknowledgment from the system DMA controller that a transfer is complete. This latter method simplifies the design of the adapter card.

Figure 5:
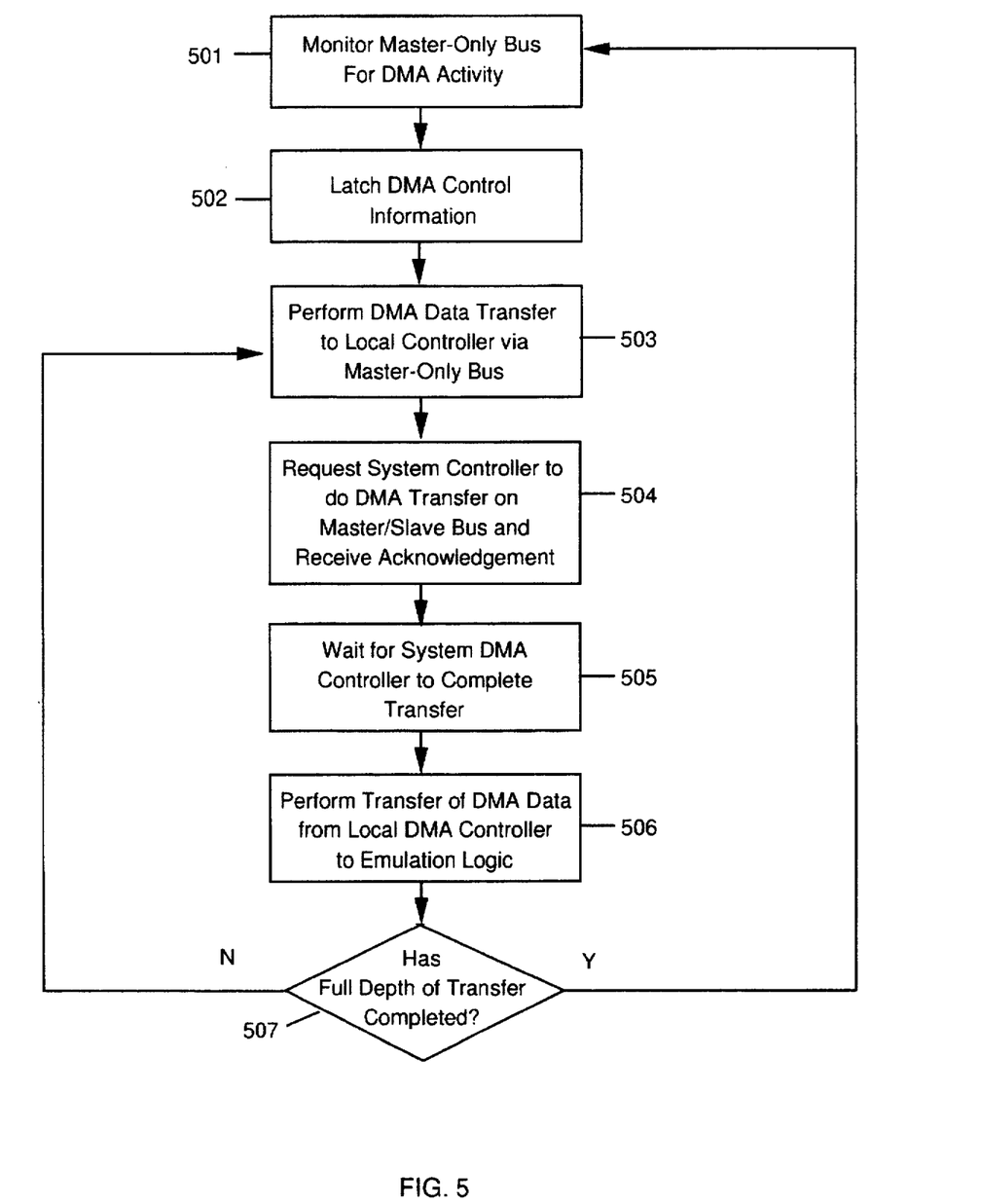
FIG. 5 shows the method according to the present invention of performing a DMA read with the local DMA controller in slave DMA emulation mode.

FIG. 5 illustrates the method according to the present invention of performing a DMA read with the local DMA controller in slave DMA emulation mode. The master-only bus is monitored at 501. When the host is ready for a DMA transfer, DMA control information including the starting address and depth of the transfer are written to the system DMA controller. The local DMA controller is snooping the bus and latches this information at 502. The local DMA controller then receives the data at 503, while at the same time requesting the system DMA controller to perform the transfer over the master/slave computer system bus at 504. The local DMA controller also receives an acknowledgment. The request and acknowledgment are handled via the DRQ and DACK lines. The local DMA controller waits for the system DMA controller to complete the transfer at 505. The transfer is complete when the DACK line is de-asserted. At 506, the local DMA controller transfers the data to the emulation logic. At 507, a check is made to see if more data must be moved to complete the transfer. If so, the process repeats from 503. If not, the process resets to the beginning.

Figure 6:
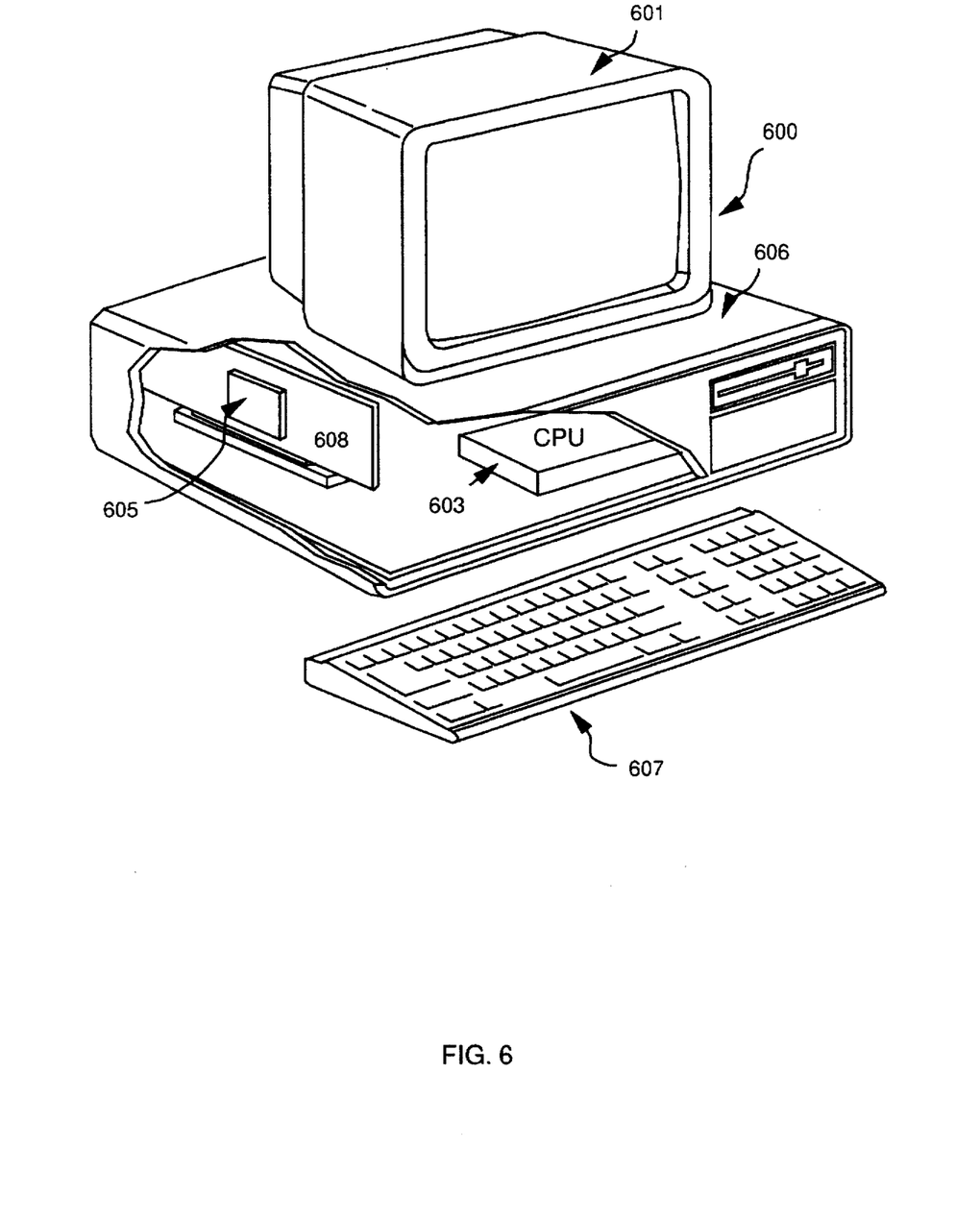
FIG. 6 shows a host computer system containing an adapter card on which the present invention is implemented.

An adapter card using this invention is used in a desktop or portable computer system 600 as illustrated in FIG. 6. The system includes a system unit 606, keyboard 607, and connections for the computer display 601. These connections are in the back of the system unit and are not shown. The system central processing unit or CPU 603 is contained on the system motherboard. The system has at least one adapter card 608 connected to both the master/slave and master-only computer system buses. In IBM compatible personal computers, the bus connector pairs are designed so one adapter card can interface to both buses. The circuitry which uses the invention 605, including the local DMA controller and the microprocessor core logic is contained on the adapter card 606. This circuitry also includes the emulation logic and the master-only bus interface. Most often these functions are integrated into a single digital signal processor or "DSP". The computer system also includes a system DMA controller, which is not shown in the Figure.

Figure 7:
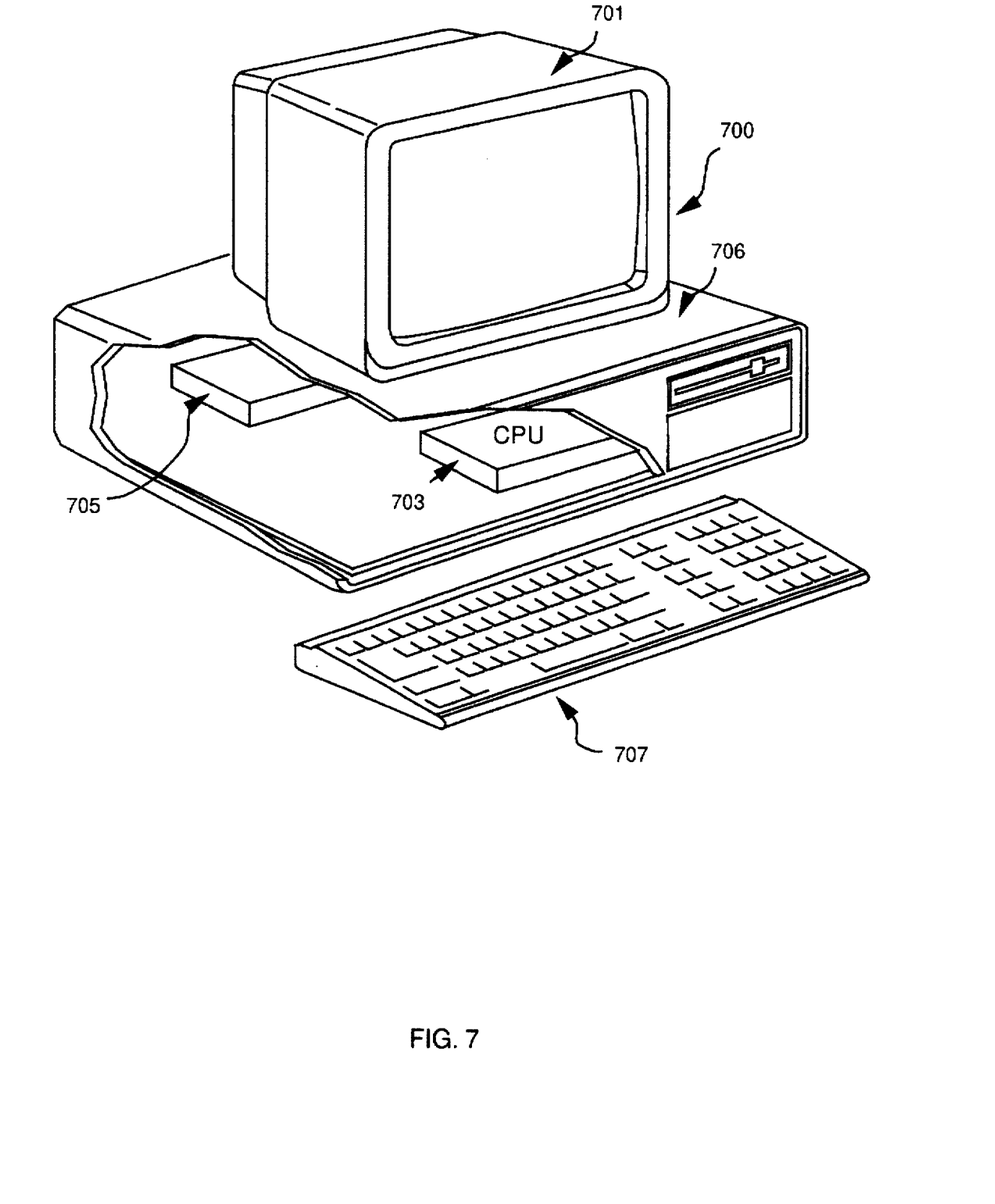
FIG. 7 shows a host computer system in which the present invention is implemented on the system motherboard.

FIG. 7 illustrates a computer system 700 in which the circuitry which uses the invention is contained on the motherboard of the computer system unit. The computer system 700 consists of system unit 706, keyboard 707, and connections for a computer display 701. These connections are not visible in the view shown. The system unit contains CPU 703. The invention processing circuitry 705, normally a DSP, is contained on the motherboard of the system unit with the CPU 703. The processing circuitry is hard wired to the master-only and master/slave computer system buses and includes the local DMA controller, the microprocessor core logic, the emulation logic and the master-only bus interface.

I have shown specific embodiments of my invention in which a local DMA controller on a special purpose adapter card or on the motherboard of a host computer can be operated using a specific method. The local DMA controller can be operated in full DMA mode or operated in slave DMA emulation mode. The invention provides a way for software in a host computer system which is designed to operate the adapter as a slave device to work properly even with an adapter on a bus that has no slave DMA support. While specific embodiments of the invention have been described, one of ordinary skill in the art can appreciate that there are many other possible embodiments of the invention.

I claim:

1. A method of operating a local direct memory access (DMA) controller in full DMA mode, the local DMA controller being on an adapter card having emulation logic, the local DMA controller capable of full DMA emulation so that slave DMA function is provided when the adapter card is connected to a master-only computer system bus, the local DMA controller having connections for a system DMA controller connected to a master/slave computer system bus, the method comprising the steps of:

receiving a word count and a starting address for a DMA data transfer;

receiving the DMA transfer request from the emulation logic;

performing a DMA transfer over the master-only computer system bus;

updating internal status registers;

notifying the emulation logic when the DMA transfer is complete; and receiving another DMA transfer request if more data needs to be transferred.

2. A method of performing a DMA write by a local direct memory access (DMA) controller in slave DMA emulation mode, the local DMA controller being on an adapter card having emulation logic, the local DMA controller capable of full DMA emulation so that slave DMA function is provided when the adapter card is connected to a master-only computer system bus, the local DMA controller having connections for a system DMA controller connected to a master/slave computer system bus, the method comprising the steps of:

monitoring the master-only computer system bus for DMA activity;

latching DMA control information for a DMA transfer request;

performing a DMA transfer of data from the emulation logic to the local DMA controller;

writing a dummy address to the system DMA controller if the DMA transfer will not be directly monitored;

requesting the system DMA controller to perform the DMA transfer on the master/slave computer system bus and receiving an acknowledgment from the system DMA controller;

determining if the DMA transfer is compete on the master/slave computer system bus;

performing the DMA transfer on the master-only bus;

notifying the emulation logic that the DMA transfer is complete; and performing an additional DMA transfer if the full depth of the DMA transfer request has not been completed.

3. The method of claim 2 wherein the determining step is accomplished by directly monitoring the DMA transfer.

4. The method of claim 2 wherein the determining step is accomplished by receiving an acknowledgment from the system DMA controller.

5. A method of performing a DMA read by local direct memory access (DMA) controller in slave DMA emulation mode, the local DMA controller being on an adapter card having emulation logic, the local DMA controller capable of full DMA emulation so that slave DMA function is provided when the adapter card is connected to a master-only computer system bus, the local DMA controller having connections for a system DMA controller connected to a master/slave computer system bus, the method comprising the steps of:

monitoring the master-only computer system bus for DMA activity;

latching the DMA control information for a DMA transfer request;

performing a DMA transfer to the local DMA controller on the master-only computer system bus;

requesting the system DMA controller to perform the DMA transfer on the master/slave computer system bus and receiving an acknowledgment from the system DMA controller;

waiting for the system DMA controller to complete the DMA transfer;

performing a DMA transfer of data from the local DMA controller to the emulation logic; and performing an additional data transfer if the full depth of the DMA transfer request has not been completed.

* * * * *